United States Patent [19]

Schmalfeld et al.

[11] 4,408,548
[45] Oct. 11, 1983

[54] PULVERIZED COAL COMBUSTION METHOD AND APPARATUS

[76] Inventors: Jorg Schmalfeld, Mohnweg 7, Heiligenhaus; Werner Bruckner, Pfalzstr. 17a, Dusseldorf; Jorn Jacobs, Waldsaum 59, Essen; H. S. Greulich, Bremensfeld 105, Oberausen; A. Schlutter, Rheinstr. 42, Kempen, all of Fed. Rep. of Germany

[21] Appl. No.: 213,938

[22] Filed: Dec. 8, 1980

Related U.S. Application Data

[63] Continuation-in-part of Ser. No. 30,737, Apr. 17, 1979, abandoned.

[51] Int. Cl.³ ............................................... F23D 1/00
[52] U.S. Cl. .................................. 110/347; 110/263; 110/264
[58] Field of Search ...................... 110/263, 264, 347; 431/10

[56] References Cited

U.S. PATENT DOCUMENTS

| 2,738,776 | 3/1956 | Burg | 110/264 X |
| 4,021,186 | 5/1977 | Tenner | 431/10 |
| 4,057,021 | 11/1977 | Schoppe | 110/347 X |
| 4,223,615 | 9/1980 | Breen et al. | 110/347 |

FOREIGN PATENT DOCUMENTS 297240 9/1928 United Kingdom ............... 110/264

Primary Examiner—Edward G. Favors
Attorney, Agent, or Firm—Jon M. Lewis

[57] ABSTRACT

A burner combines air cooling and pulverized coal combustion with air for the combustion of low inflammability coals. A ceramic lining protects the cooled steel mantel of the burner while supplying heat for sustained combustion process. Air preheated in the cooling process is used to preheat the coal and to supply secondary air imparting a helical trajectory to the coal particles close to the ceramic lining. The ceramic lining is formed in situ around the flame chamber from molded plastic ceramic hardened by burner operation.

72 Claims, 6 Drawing Figures

PULVERIZED COAL COMBUSTION METHOD AND APPARATUS

This application is a continuation-in-part of patent application Ser. No. 030,737 filed on Apr. 17, 1979 now abandoned by Schmalfeld et al for "Combustion of Coal".

REFERENCE TO RELATED PATENT APPLICATIONS

This application is related to the following patent applications:
(1) Patent application Ser. No. 030,739 filed on Apr. 17, 1979, abandoned, by Schmalfeld et al for "Cooling of a Coal Combustion Apparatus";
(2) Patent application Ser. No. 030,741 filed on Apr. 17, 1979, abandoned, by Schmalfeld et al for "Combustion of Coal";
(3) Copending patent application Ser. No. 204,619 filed on Nov. 6, 1980, abandoned, by Schmalfeld et al for "Cooling of a Coal Burner"; and,
(4) Copending patent application Ser. No. 204,617 filed on Nov. 6, 1980, abandoned by Schmalfeld et al for "Method and Apparatus for the Combustion of Pulverized Coal".

BACKGROUND OF THE INVENTION

The invention relates to method and apparatus for the combustion of pulverized coal in general, and more particularly for coals having a low flammability such as semi-bituminous coals and anthracite.

Low flammability is due in the first place to a lack of volatile gases which are inherent to a particular kind of coal or which result from treatment of the coal. This may be desirable in order to be able to stack the coal without risk of explosion caused by the accumulation of gas and air mixture in the closed containers. However, the low flammability of such coals make it difficult to start the combustion process in a burner. For start-up with coal dusts of this kind, it has been necessary in the past to add propane gas and light oil as additional fuel. In such instances, coal dust amounts to 70% while 26% of light oil is added with 4% of propane gas. This is not a good economical proposition, especially because of the propane gas.

An object of the present invention is a method and an apparatus for an effective combustion of pulverized coal of poor flammability.

SUMMARY OF THE INVENTION

The invention resides in method and apparatus for the combustion of low flammability coal by maintaining in the flame chamber the combustion temperature below the slag melting point of the coal and by providing thermal accumulation around the flame chamber for supplying high amounts of heat to the fuel.

As a result of being conducted under the slag melting point, the combustion can be considered as dry combustion since there is no fusion and only a relatively soft ash is generated. Soft ash is beneficial since it does not stick to the burner housing; it therefore does not impede thermal transmission from around the flame chamber to the injected fuel.

Thermal accumulation for relatively large amounts of heat to the coal is important. However, heat stresses must be prevented in order to avoid excessive temperatures. To this effect, a ceramic lining is used which is attached to the housing of the burner and surrounds the flame chamber. In order to maximize heat exchange with the pulverized coal injected in the flame chamber, the coal particles are bound to follow helical trajectories about the axis of the flame chamber and the ceramic lining is given a shape which conforms with the widest trajectories of the particles. The ceramic material is brought into place within the housing in a platic state and conformed in situ to the intended shape with a mold and under pressure. Hardening of the ceramic takes place while the burner is first set into operation.

While coal in pulverized form is mixed with primary air for injection as fuel, helical movement is imparted to the coal/air mixture either directly or through a swirling secondary air stream applied concentrically. The helical trajectories of the coal particles cause a stay time in the flame chamber which are many times the usual fuel stay time. This prevents the extinction of the flame when it is pulled down by the injection of fuel while it is revived by fuel combustion in other regions of the flame chamber where under the accumulated heat surrounding the flame chamber combustion is sustained. In other words, a pull down of the flame by the injected fuel is prevented by heat radiation and heat convexion in the flame chamber. Radiative heat is provided by the flame itself and the thermal accumulator around the chamber, while convexion results from swirling of air/coal mixture in the chamber. Helical motion increases the heat transfer effect by dispersing the coal in the combustion chamber. Also, the helical trajectory has a centrifugal effect which tends to bring the particles outward, thus, toward the housing surrounding the chamber. Some of the particles will even come in contact with the thermal accumulator, e.g. the ceramic lining. The heavier coal particles are less affected by the centrifugal force while lighter particles are more likely to come into contact with the ceramic lining. This reduces the erosion of the ceramic lining since lighter coal particles will erode less than the heavier ones.

The spiral trajectories are preferably generated by injecting the coal dust/air mixture straight into the flame chamber while a stream of secondary air is blown with a swirling effect. In this fashion, the lighter particles are entrained by the helical air stream into more or less spiralling trajectories to the outside and along the confines of the flame chamber close to the thermal accumulator in the ceramic lining.

The burner preferably has a rate of efficiency per volume of the flame chamber of 0.3 to 0.7 MW per m$^3$. The combustion temperature typically is below 1350 degrees C in order to keep dry combustion. A definite grain size is selected for the coal in order to improve flammability. For instance, with anthracite the particles should be less than 0.05 M/M, and with coke the maximum is 0.15 M/M. Also, the moisture must be kept below 2%.

The apparatus, according to the invention, provides for cooling of the housing of the burner. The housing is a hollow steel mantel cooled by air circulated therethrough. The cooling process is integrated with the combustion process. Air heated by cooling is used to preheat and dry the coal, also used as primary and secondary air. Tertiary air is also blown into the opening of the flame chamber which is provided by air cooling. Temperatures are thus maintained in a continuing air flow process which concur in determining and maintaining the desired combustion temperature in the flame chamber and the proper heat transfer with the ceramic lining.

Finally, an integrated structure is designed which contains and distributes the air supplied as cooling agent and also fed as combustive agent into the burner. A simple, inexpensive, sturdy construction is conceived, according to the present invention, for providing an efficient burner capable of burning low flammability coals.

The air-cooled burner, according to the present invention, is particularly suitable for a pulverized coal burner, e.g. one in which a mixture of air and pulverized coal is injected to generate a flame extending through the opposite end. The invention is also applicable to a burner having a flame chamber and an air flow system such as described in copending patent application Ser. No. 030,739 filed on Apr. 17, 1979 by Schmalfeld et al for "Cooling of a Coal Combustion Apparatus"; or in copending patent application Ser. No. 030,741 filed on Apr. 17, 1979 by Schmalfeld et al for "Combustion of Coal"; or in copending patent application Ser. No. 030,737 filed on Apr. 17, 1979 by Schmalfeld et al for "Combustion of Coal"; or in copending patent application Ser. No. 204,619 filed concurrently by Schmalfeld et al for "Cooling of a Coal Burner"; or in copending patent application Ser. No. 204,617 filed concurrently by Schmalfeld et al for "Method and Apparatus for the Combustion of Pulverized Coal".

DESCRIPTION OF THE PREFERRED EMBODIMENT OF THE INVENTION

Figure 1:
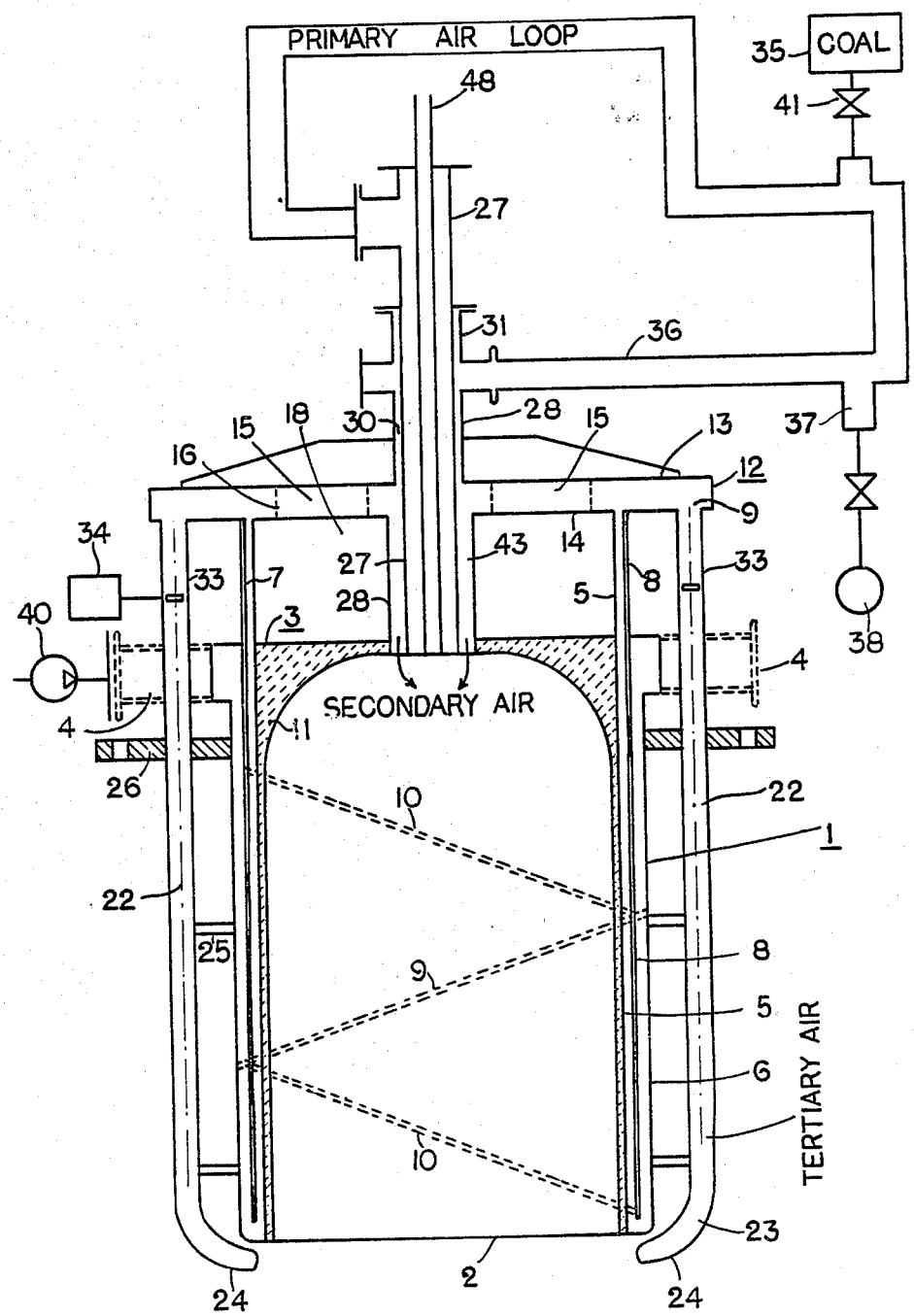
FIG. 1 shows schematically and in cross-section the overall structure of the burner according to the invention.

Referring to FIG. 1, a burner is shown having, typically, a capacity of 5 MW. This value lies in the practical range for this kind of burner, namely, 0.5 to 10 MW.

The burner, typically, is cylindrical and provided with a steel mantel having a double wall. One end of the mantel is open, the other end 3 is closed. The mantel with its double wall 1 is provided at its upper end 3 with two inlets 4, for the intake of cool air. In operation the cool air admitted in the inlet 4 of the steel mantel is forced to circulate along the outer cylindrical wall 6 down to the lower end 2, then in a reverse flow along the inner cylindrical wall 5 up to an annular outlet 7 near end 3. The separation between the downstream circulation from inlet 4 and the upstream circulation to outlet 7 is provided by a cylindrical partition, or guiding plate 8 disposed between the inner wall 5 and the outer wall 6 of the mantel. Moreover, deflecting plates 9 and 10 are provided in the annular spaces, defined between the walls of the mantel 1 and the guiding plate 8. Deflecting plate, or fin, 9 runs helically along the inner side of the outer wall 6 and is mounted thereon. Deflecting plate, or fin, 10 also runs helically, but at the inner side of partition 8, upon which it is mounted. Fins 9 and 10 impart to the air flow between the two walls of mantel 1, a continuous motion in spiral downward and upward. The heli pitches of the respective plates 9 and 10 are in opposite directions, thereby to provide a continuous and aiding direction of rotation of the air along the successively opposed paths, e.g. between the outside wall 6 and partition 8, and between the inside wall 5 and partition 8, respectively. A reverse pitch relation would cause a substantial resistance to flow. Plates 9 and 10 each form a single heli. They could also be such as to form a plurality of helices. An extension upward of the inner wall 5 of the mantel and of the partition plate 8 provides an annular passage as the outlet duct 7 above the upper end 3 of the burner.

The steel mantel forms a unitary welded construction including the inlet pipes 4, the mantel inner walls 5 and 6, the annular outlet duct 7, the partition plate 8 and the deflecting plates 9 and 10. A ceramic lining 11 is applied to the inside wall of the steel mantel 1. The flame chamber is, thus, according to the invention, surrounded by the ceramic lining 11 within a cylindrical space extending from the open end 2 up to the closed end 3 of the mantel. The ceramic lining consists in part of aluminum oxide or of silicium carbide. When silicium carbide is used, the proportion is at least 20% and at most 95%. These proportions are preferred but not required. Instead of a ceramic lining, another type of lining may be considered. However, the lining should exhibit an average thermal capacity ranging from 0.2 to 0.3 Kcal/Kg and per degree Kelvin or 0.22 to 0.35 watt/Kg and per degree Kelvin. In practice, the thermal capacity is 0.25 Kcal/Kg and per degree Kelvin. The thermal conductivity number lies between one and 20 watt/m and per degree Kelvin. Provided an even thickness of between 10 and 50 m/m is maintained for the ceramic lining, and if the cooling of the burner mantel has an efficiency of 200 to 300 watt/m$^2$ and per degree Kelvin, the walls of the burner will be able to sustain a higher thermal capacity and thermal conductivity during heat transfer without any risk of local overheating.

Typically, with the steel mantel 1 and the ceramic lining 11 the overall cross-dimension of the burner is 1200 mm, while the overall length is 2000 mm. This results in an efficiency rate of the burner related to the flame chamber volume which is 0.5 MW/m$^3$. This ratio lies within the acceptable range of 0.3 to 0.7 MW/m$^3$. These values correspond to a relatively small load of the firing chamber and thus insures a stable combustion. An unstable combustion is likely when the loading is 2 MW/m$^3$ or more. All the above stated figures characterizing the loading of the combustion chamber are taken for 1 bar and 1 hour.

Referring to FIG. 1, the ceramic lining 11 is so constructed that towards the upper end 3 of the burner its form is like a round vault. The shape shown in FIG. 1 is obtained with the aid of a mold. Thus, the ceramic material used for the lining is first in a plastic state, that is, the material is like a paste, or clay, when it is introduced and pressed in the space left between the form and the mantel 1. It may also be pressed back by the form against the mantel if it has been brought there first. It is essential that the material be evenly distributed during the molding process. Such an even distribution is necessary for an homogeneous lining. An homogeneous lining will provide overall balanced conditions for thermal conduction and thermal accumulation. From its initial plastic state, the material passes to its final ceramic solidity as a result of hardening at least during burner operation.

A solid connection between the steel mantel 1 and the ceramic lining 11 is achieved with pins, mats or wires attached to the mantel and embedded in the material when formed as a lining. As a result of the pins being oriented radially, a good fixation is obtained in the axial direction of the cylindrical steel mantel while gliding is allowed in the radial direction of the ceramic lining, so that any difference in thermal expansion between the ceramic lining 11 and the steel mantel 1 will not cause stresses in the ceramic lining 11. As to thermal expansion along the axial direction of the steel mantel, this is compensated by an overlapping joint.

Figure 2:
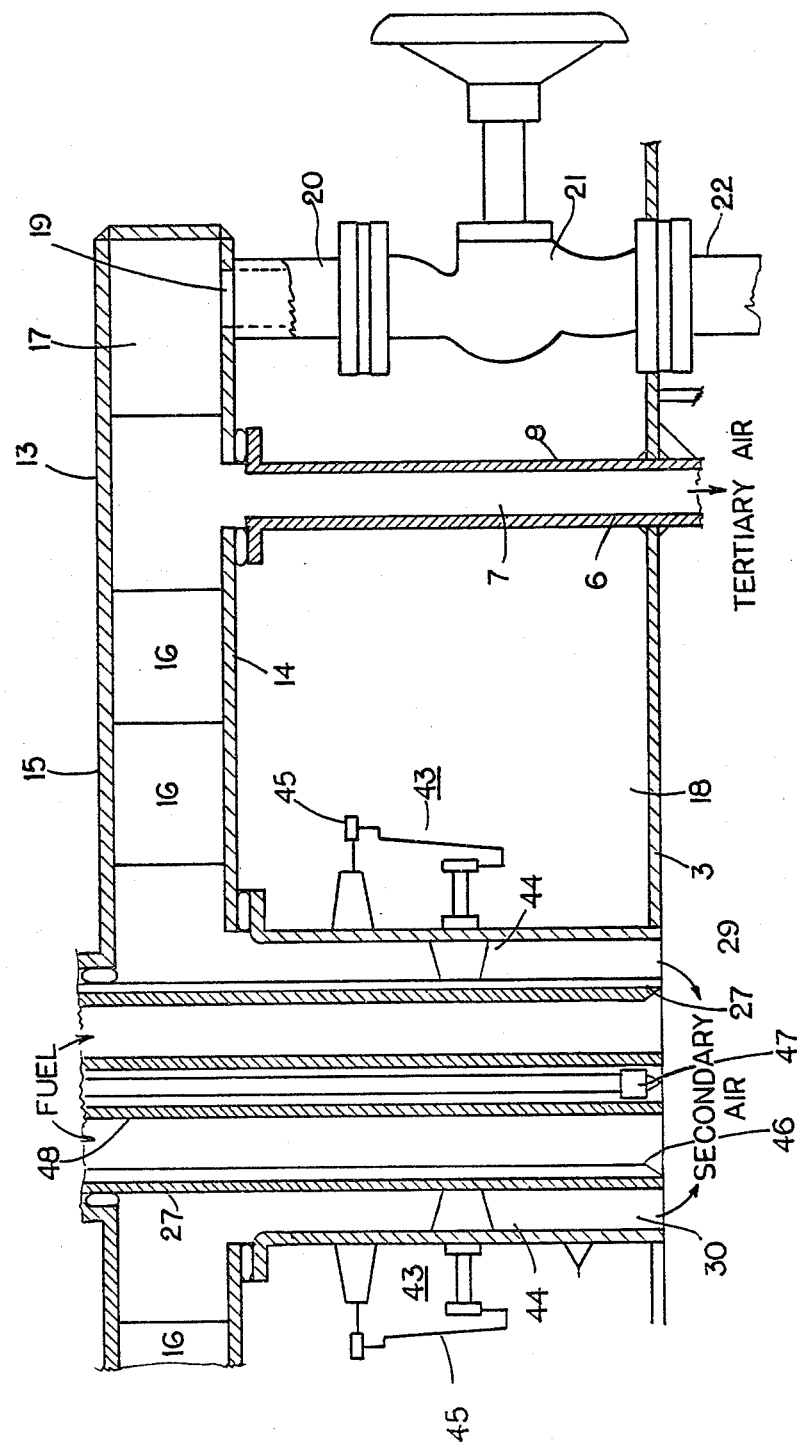
FIG. 2 is a detailed view of the air distribution passages associated with the upper part of the burner of FIG. 1.
Figure 3:
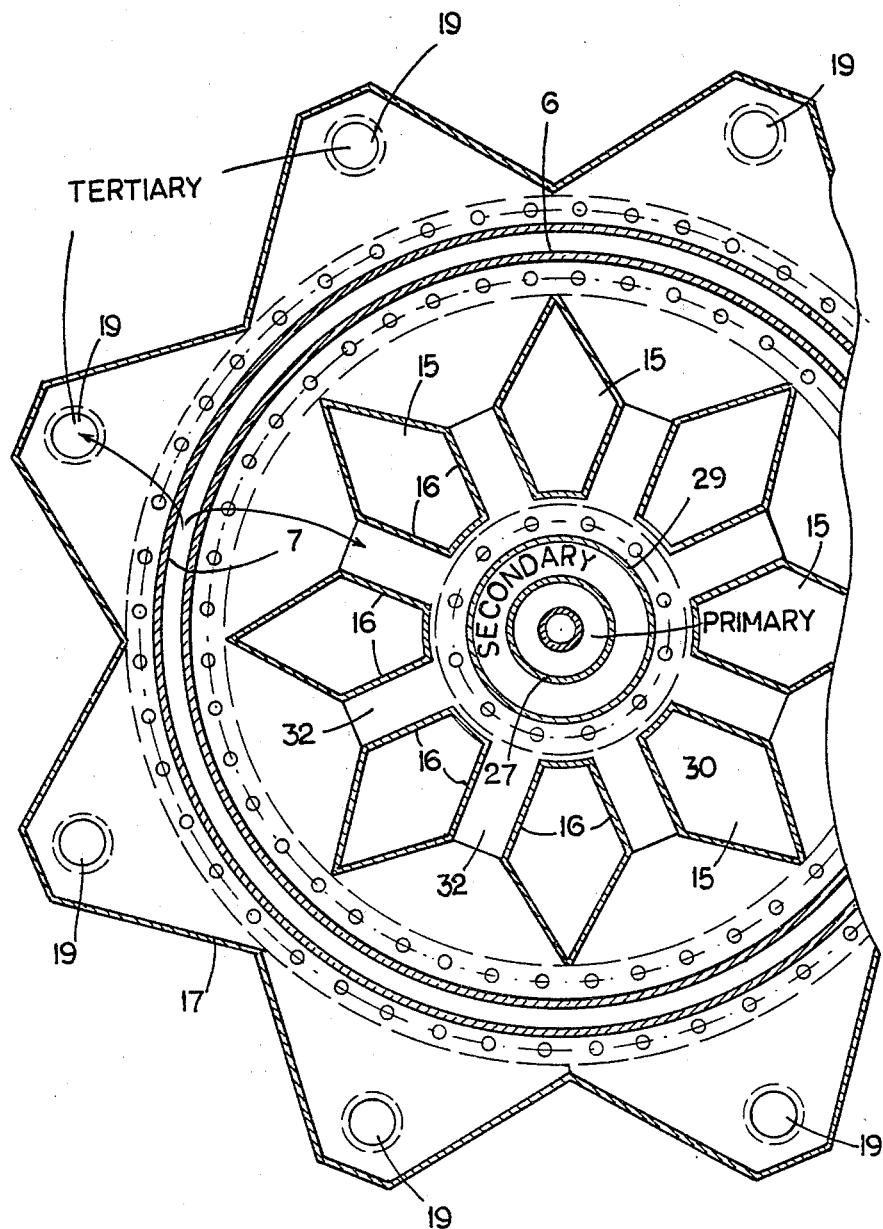
FIG. 3 is a horizontal view in cross-section of the air distribution passages of FIG. 2.

In operation, the stream of cold air forced through the steel mantel provides an effective cooling. Cooling can also be achieved with water or other liquid coolant. The air which has circulated through the steel mantel 1 emerges from the annular outlet or passageway 7 into a distributor deck 12. FIG. 2 shows a vertical cross section of the upper end of the burner and a distributor deck 12. The distributor deck 12 extends horizontally and concentrically around the central pipe 27 (FIG. 1) leading directly to a central opening in the vault of the ceramic lining 11 and aligned with the longitudinal axis of the burner. A mixture of pulverized coal and air is injected by forced circulation through pipe 27 into the firing chamber of the burner. When starting the combustion, an ignition or igniting lance 47 is lowered in a tube 48 within pipe 27 into the flame chamber (FIG. 1). Concentrically of pipe 27, a pipe 28 of larger diameter is also mounted above the central opening at the top of the ceramic lining. The purpose of pipe 28 will be explained hereinafter. The distributor deck 12 is mounted mechanically and air tight, preferably by welding, in order to form a unitary construction with pipe 7 and pipe 28. As shown in FIG. 2 and in FIG. 3 (which is a horizontal sectional view along the section plane III/III of FIG. 2) the distributor deck 12 consists of two parallel identical star-shaped plates 13 and 14. Plate 14, which is below plate 13, appears in FIG. 3 as seen from above. Annular passageway 7 is concentric to pipes 27 and 28. It is defined between a cylindrical wall 6 of the mantel and the partition or guiding plate 8 and it connects the cooling system of the mantel with the distributor deck 12 through the lower plate 14. The space between plates 13 and 14 connects, through the concentric pipe 28, with the interspace 30 between pipe 28 and central pipe 27. The star-shaped plates extend as shown in FIG. 3 in eight directions encompassing the eight respective inlets 19 of eight vertical pipes 22, of which two are shown, at 22 laterally of the burner, extending longitudinally from the distributor deck 12 down to the opening 2 at the lower part of the burner. Pipes 22 terminate with nozzles 23 oriented at an angle toward the central axis of the burner. Referring again to FIG. 3, plates 13 and 14 possess apertured regions 15 having adjacent walls 16 sealed to plates 13 and 14, and defining between such apertured regions a plurality of individual air tight passageways 32 connecting the annular passageway 7 to the central annular interspace 30 between wall 29 and wall 27. The extensions of plates 13 and 14, which form the tip of the stars around inlets 19 to pipes 22, also have adjacent walls 17 which are sealed along the entire surface of the plates. Therefore, the eight extensions of the star in the distributor deck 12 belong to eight individual passageways from annular space 7 to respective pipes 22. Plates 13 and 14 form by welding a unitary construction joined by walls 16 and 17. The apertured regions 15 within plates 13 and 14 form with the adjacent walls 16 eight passageways between the outside and the space 18 situated between the welded distributor deck structure 12 and the top 3 of the steel mantel. The apertured regions 15 are shown in FIG. 3 to be rhombohedrical. They could simply be round, a form which is more readily achieved. The same can be said of the peripheral line of the distributor deck 12 which can be made round, rather than star-shaped. At any rate, the extensions of the star-shaped distributor deck are useful since they provide the function of a funnel. This function is due, as shown in FIG. 3, to the triangular or narrowing regions at the tip of the star which surround a round aperture 19 in the lower plate 14 connecting the inner space of the distributor deck 12 with a pipe 20 welded thereto. Each such pipe 20 is mounted on top of a controllable valve 21, itself coupled to an adjoining pipe 22. The controllable valves allow for variable operation of the burner. For constant operation, the air distribution is according to a fixed stream cross-section. All pipes such as 22 are mounted outside the steel mantel 1 laterally and longitudinally. Each pipe at its remote end is curved at 23 to form a nozzle 24 having its mouth ending just under the open end 2 of the steel mantel 1. Nozzles 24 are at an angle of 70 degrees relative to the longitudinal axis of the steel mantel 1 and is radially oriented. This angle lies in a permissible range of 60 to 80 degrees. When the nozzles 24 are oriented exactly in respective planes of symmetry of the steel mantel 1, the axes of the jets are each at zero degree relative to such plane. If necessary, the nozzles 24 may be out of such particular plane. In such a case an angle of 30 degrees between the axis of the jet and the intersecting radius is still acceptable. Pipes 22 are supported by the steel mantel 1 through spacers 25 and the flange 26 of the burner. The burner is mounted on the boiler (not shown) by means of the supporting flange 26. When so mounted, the burner is projecting into the furnace chamber of the boiler from flange 26 all the way to its front end 2. In contrast to other burners, such as the conventional front, or top burners which have the injection of fuel essentially flush with the wall of the boiler, the burner according to the invention exhibits inside the steel mantel 1 and its ceramic lining 11, a protected flame chamber or flame cavity which is separate from the remaining firing chamber of the boiler, or furnace.

Figure 4:
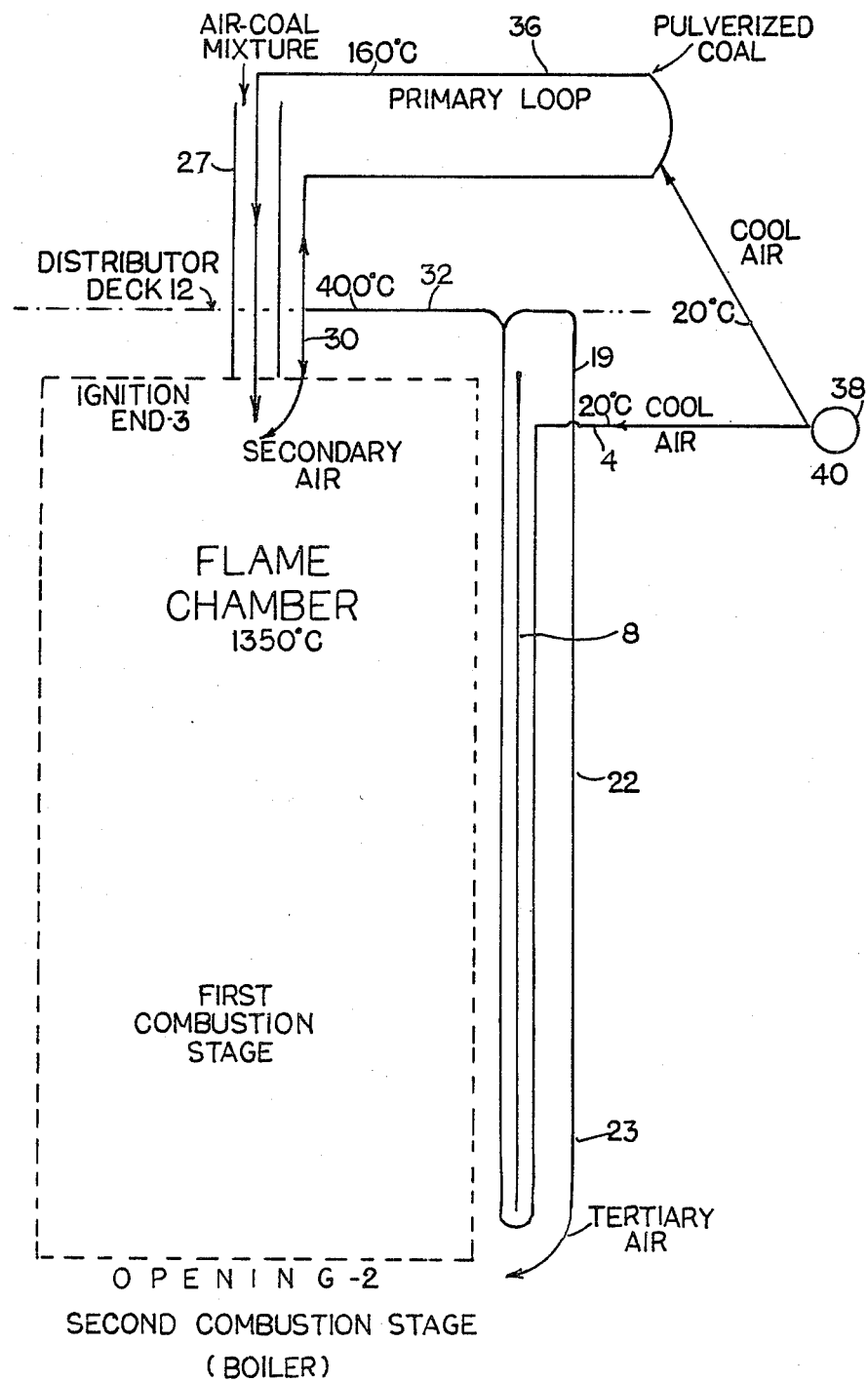
FIG. 4 is a schematic representation of the air flow system obtained by combining FIGS. 1 to 3.
Figure 5:
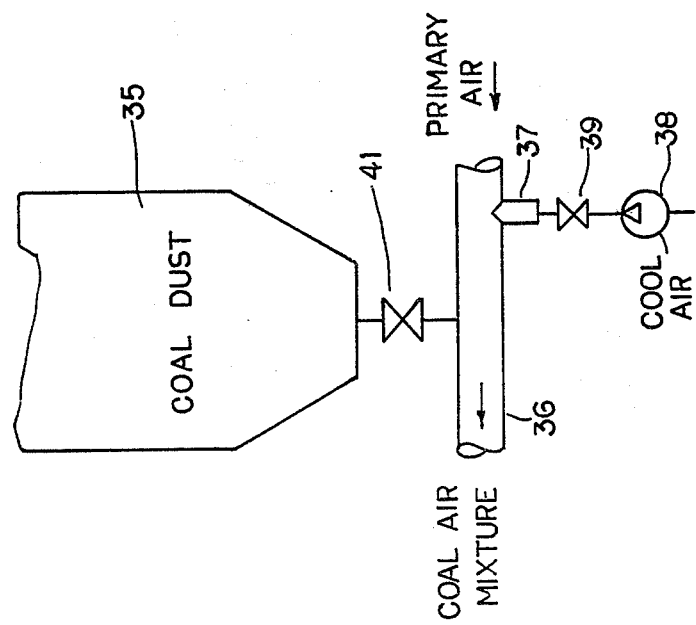

Referring to FIG. 4, air flows are shown: (1) the air flow into and out of the steel mantel, namely around cylindrical partition plate 8, (2) the supply of air and pulverized coal forming the primary stream injected into the central pipe. FIG. 4 also shows schematically the division of the air streams in the distributor deck 12. These streams should be considered in the light of the explanations given by reference to FIGS. 1 to 3. A blower 38 (FIG. 5) injects, via valve 39 and intake 34, cool air into a pipe 36 which is connected to the outlet of concentric pipe 28 about the distributor deck 12 (see FIG. 1). Pipe 36 returns to the inlet of central pipe 27 at a high point thereof (see FIG. 1). Also, as shown in FIG. 5, pulverized coal from stoker 35 is injected via valve 41 into the main stream of pipe 36 to form a coal and air mixture led to the central pipe 27. FIG. 4 schematically shows air circulation on one side of the flame chamber of the burner defined by steel mantel 1 and ceramic lining 11 (shown only in FIG. 1). It is understood, however, that deflecting plate 8 is cylindrical and that the air injected at 4 (FIG. 1) in the hollow mantel 1 in fact surrounds completely the flame chamber in its way down from the upper and closed end 3 to the lower and open end 2, then back from the lower end 2 to the closed end 3. The cooling air emerges at 7 into the distributor deck 12 where it divides itself radially into one stream to the center at 32 and one stream to the periphery by 19. The latter air stream goes through the respective pipes 22 and is projected just under the opening 2 of the flame chamber by respective nozzles 23. The former air stream 32 is further divided when it reaches concentrical pipe 28. One portion goes by 30 downward in pipe 28 and supplies additional combustive fluid into the ignition zone; e.g. the start of the flame, below the vault of the ceramic lining. The second portion from stream 32 is forced upward in tube 28 and out in pipe 36 as already seen. Thus, cool air participates in cooling the steel mantel around plate 8, which in fact preheats the air before it reaches as secondary air by 30 the flame area. The primary loop receives such preheated air from pipes 28 and 36. Along pipe 36 this preheated air is cooled by an intake of cool air from blower 38, thus, before the injection of pulverized coal from 35. The tertiary air, which is also preheated air, is distributed with turbulence by the nozzles 23 into the mouth of the burner. Referring again to FIGS. 1 to 3, it appears that the fuel in the form of coal dust mixed with air is supplied at the upper end of steel mantel 1 through central pipe 27 into the flame chamber. Above the distributor deck 12, a pipe 28 of larger diameter than pipe 27 is mounted concentrically and welded to plate 13, e.g. around a hole bored therethrough. Below the distributor deck 12, another pipe 29 of still larger diameter is mounted concentrically to pipe 27 and welded to plate 14, e.g. around a hole bored therethrough. Tubes 27 and 28, thus, define an annular space 30 establishing fluid communication between the distributor deck 12 and the flame chamber. Similarly, tubes 27 and 28 define an annular space 31 establishing fluid communication above the distributor deck 12 with tube 36 (FIGS. 1, 4 and 5).

As it appears, the air stream emerging from the annular outlet 7 is divided by the distributor deck 12 in different directions. It reaches tubes 22 which end as nozzles 24, the annular space 30 and the annular space 31. In order to facilitate the flow of air toward annular spaces 30 and 31, the distributor deck 12 is provided with regularly space apertures 15 having adjacent walls defining passages such as 32, which are aligned with the respective outlets 19 to pipes 22, which passages are in the form of a funnel. Thus, the outlets 19 and passages 32 belonging each to one funnel, as shown in FIG. 3, are facing each other on opposite sides of the annular space 7. Therefore, the emerging air stream is guided in an optimal manner to the corresponding outlet 19, or passage 32. The distribution of air streams by the distributor deck 12 occurs in definite proportions. 10 to 30 percent of the air output of the annular space 7 pertains to annular space 31, whereas 25 to 50% of this total goes to tubes 22 which feed the nozzles 24. The remaining amount is supplied through the annular space 30 to the flame chamber. These proportions are regulated by dampers mounted in the various ducts such as flaps or valves, for instance adjustable valve 21 of FIG. 2. The range of adjustment should be as small as possible in order to minimize losses resulting from excessive regulation and those inherent in the structure. Accordingly, the maximum adjustment is from 1 to 2.5. Moreover, air flow regulation should take place as much as possible through the adjustable valve 21 of tube 22 (see FIG. 2). In order to establish a set point in the regulation, the debit in tube 22 is first established. To this effect, sensing diaphragms 33 are inserted in tubes 22 (see FIG. 1). An indicator device 34 is operatively connected to diaphragm 33. Depending upon the value of the deviation from a reference value shown by indicator 34, the adjustable valve 21 is actuated by hand. At any rate, the valve adjustment, like any other valve, or damper, provided for the regulation of flow, should remain unchanged during the burner operation as well as during startup. Specifically, the speed in tubes 22 when burning anthracite dust fed at 600 Kg/h is 80 m/sec. This speed corresponds to 35% of air relative to the total air flow. Assuming 15% of air in the annular space 31 and 50% in the annular space 30, the debits of air are 15 m/sec in pipe 27 and 50 m/s in annular space 30. This is within the favorable range of 10 to 20 m/sec in pipe 27, of twice to four times this debit in annular space 30 and five to seven times the debit in tube 22. The maximum air flow is about 100 m/sec.

The temperature of the air entering the distributor deck 12, when the burner is operating just under the maximum permissible temperature of 1350 degrees C., is in the order of 400 degrees C. following an entry of air in the hollow mantel at the temperature of 20 degrees C. With such temperature, the heated air flows through the annular space 31 into pipes 36 which lead to the coal supply from stoker 35. Pipes 36 are welded laterally to the flange of pipe 28. The air flowing in pipes 36 is considered as primary air. The primary air at 400 degrees C. is mixed with air at 20 degrees C. before reaching the coal stoker. Such mixing is in the amount of 70% of air at 20 degrees C. The 20 degree C. primary air is forced in tube 36 by a blower 38 via a valve 39 and an intake 37. The necessary amount of cold air is adjusted with valve 39. Blower 38 is provided with a sufficient capacity. Thus, the air supply is by forced circulation like into inlet pipe 4 of the steel mantel 1. FIG. 1 shows schematically a blower 40 associated with the inlet pipe 4. If preferred, instead of two blowers 38 and 40, a single blower with separate outputs can be used.

As a result from the cooler air added inside tube 36, the primary air initially at 400 degrees is readily cooled off to a point that when it reaches the coal dust, admitted from stoker 35 via valve 41 into tube 36, the temperature will be well under the igniting temperature of the coal dust. This temperature should be just above the desired entry temperature of the coal-air mixture in tube 27. This is achieved by keeping short the distance which could cause heat losses from the coal stoker 35 to pipe 27 and/or by heat insulation on tube 36. The exit temperature of tube 36 which is equally connected to central pipe 27 and to concentrical pipe 28, or the entry temperature of the coal-air mixture in pipe 27 is 160 degrees C. This temperature lies within the permissible range of 100 to 200 degrees C.

Figure 6:
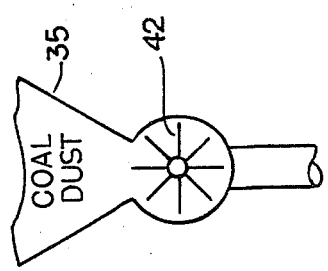
FIGS. 5 and 6 schematically illustrate the supply of pulverized coal into the air system of FIGS. 1 to 4.

Valve 41 (shown in FIG. 5 between stoker 35 and tube 36) is provided for controlling the coal input. The coal amount is adjusted at 900 gr/m$^3$, depending upon the density of the dust in the coal-air mixture. A plain damper-type valve can be used as regulating device 41 in order to provide the proper coal dust amount. For more precision in regulating the amount of coal dust, forced feeders, for instance, can be used to take amounts of coal dust from the stoker 35 and force it into tube 36. As shown in FIG. 6, such a system may use a paddle wheel 42 disposed under the funnel-like lower end of the stoker 35. In relation to an adjustable speed of rotation, predetermined quantities of coal dust can be exactly fed from between its paddles into tube 36 below.

The air-coal mixture outputted through central pipe 27 into the flame chamber is surrounded by an annular air stream within annular space 30 which will be considered hereinafter as secondary air. The secondary air reaches the temperature of 400 degrees C., like the air circulating in the annular space 31, and a spiral trajectory is imparted to it by a swirl imparting device 43. Device 43 consists of a plurality of blades 44 evenly distributed inside the annular space 30 and mounted in pipes 27 and 29 so that they can swivel unless locked by a locking device 45. Blades 44 are conforming with the annular cross-section of space 30 and can be oriented so that the secondary air receives adjustment of the blades a definite spiralling effect typically of 10 to 80 degrees. It is desirable that the range of adjustment of blades 46 be as small as possible so that blades 44 nearly completely occupy the annular space 30. Locking by 45 is achieved, for instance, with a rod pivotally mounted on pipe 29 which can be fixed in any desired position by sticking it into one of a plurality of holes corresponding to several positionings of the blades. This rod or arm is actuated by hand through the openings 15 in the distributor deck 12. If adjustment of the swirl imparting device 43 has to be made during operation of the burner despite the heat and the risk of being burned, a chain-driven wheel may be provided which can be rotated with the chain through the opening 15 without danger. Instead of a chain, any other mechanism can be used to drive the wheel.

Also, instead of a swirl imparting device 43, a number of nozzles could be arranged along a spiral trajectory surrounding pipe 27. The stream of coal/air mixture projected out of pipe 27 is straight and without vortex, thanks to the addition of longitudinal plates 46 equally distributed and mounted against the inner wall of pipe 27. In contrast, the secondary stream in the annular space 30 acquires more or less swirling depending upon the setting of the swirl imparting device. Considering the secondary air stream and the coal dust/air mixture as a single stream, the swirling participates in the total by at least 30% and by 90% at most. The vortex effect can be generated another way. For instance, without any swirling of the secondary air stream but with swirling in the ejection of coal dust/air mixture. The preferred embodiment, however, takes advantage of a particularly favorable situation. Since the secondary air is under a swirling effect, the lighter particles of the coal-/air stream follow a large spiralling trajectory, in contrast to the heavier particles of coal which are less affected. Therefore, due their larger trajectory the lighter particles under the effect of the centrifugal force will be sent to the outside in the vicinity of the ceramic lining 11. When close to the ceramic lining, the coal dust particles are most strongly exposed to the heat accumulated in the combustion process. This causes the coal dust particle to inflame at a time the flame, due to the entry of the fuel in the fuel chamber, might tend to be extinguished. This effect is magnified by a longer stay of the burning particles in the flame chamber and especially when there is preheating of the coal. The longer stay of the particles insures that the flame in the flame chamber of the steel mantel 1 and the ceramic lining 11 will not be completely extinguished if an extinction of the flame is about to occur due to the arrival of the fuel.

Such extinction may be caused by a disturbance in the flow of the fuel. Nevertheless, the flame will be re-started at the entry of the fuel by the remaining flame in the flame chamber. The favorable effect of the particle stay time increases with time. Such duration depends upon the vortex angle of the secondary air. On the other side, an excessive vortex angle will cause substantial stream losses. Therefore, a compromise must be reached between the stay time and the unfavorable stream losses. Besides the stay time and the thermal effect of the lining (which by the way should not exceed a certain dimension in order to maintain the operating temperature around 1350 degrees C. and which must be cooled by cool air passing through the steel mantel in order to keep a cooling efficiency between 200 and 300 watts per m and degree Kelvin), consideration should be given to the fact that the fuel is so brought near combustion by an even preheating due to the warm primary air that it takes only a relatively small amount of heat to bring the coal to the ignition temperature.

In the flame chamber is performed the first stage of a two-stage combustion process. The first stage is established by the setting of the secondary air and primary air, e.g. the supplied coal dust/air mixture, as well as by the working effect of the secondary air. This means that the swirling effect and the stay time should be adjusted for this burning stage. In this first stage, total combustion should be effective within the steel mantel 1 and lining 11 at a rate of $\alpha = 0.4$ to $0.8$, where 100% corresponds to $\alpha = 1$. In the preferred embodiment, the combustion rate was selected to be rather toward the higher range. This rate is achieved by combustion was selected to be rather toward the higher range. This rate is achieved by combustion under the stoichiometric proportions. For this purpose, all the oxygen necessary to meet the molecular ratio of the fuel is not supplied. Therefore, an incomplete combustion takes place and the coal dust particles do not burn one after the other, but rather altogether. The ensuing retarded combustion reduces the formation of nitric oxides (NOx).

Since the temperature of 1350 degrees C. is not exceeded in the first combustion stage, no liquid fusion occurs. A dry combustion process is taking place. The coal particles which are partially burnt are soft, as opposed to fused and hardened slag particles. Such soft coal particles cause much less erosion of the lining of the burner.

In the second stage, thus, outside the space surrounded by the steel mantel 1 and lining 11, tertiary air is supplied by tubes 22. With such tertiary air, the combustion ratio must exceed the stoichiometric proportions. This means that an excess of air is produced. With an excess of air, an economical optimum should be reached between the minimum air stream necessary to completely burn the particles and the favorable effect of a strong excess of air in the thermal accumulation in the heat exchange exposed to the exhaust gasses.

While an excess of flue gas facilitates the storage of heat in the heat exchanger, with larger amounts of air the ability to produce the necessary quantity to generate a given quantity of flue gas becomes more difficult. This difficulty results, among other factors, from the stream resistances which increase more than proportionally with increased speed. This applies particularly to the stream proportions in steel mantel 1 which are determined, among other factors, by the cross-sections to flow and the definite degree of air deflection due to the inclination of the deflecting plates 9 and 10. Therefore, it is to be watched that the air with decreased pitch for the same stream speed will have a longer stay time inside the steel mantel 1 and, therefore, will be exposed to more heat. Besides, the deflecting plates impart to the air a forced circulation under any external condition around the steel mantel, so that any localized burn-out which would pit or scrape the mantel is prevented.

With the assist of nozzles 24, and different orientations of tertiary air, the flame of the steel mantel 1 can be adjusted at will to accommodate the geometry of the associated boiler. Adjustment, for instance, may be a lengthening or a widening or a dispersion of the flame.

To the extent that the nozzles 24 are oriented at an angle to the longitudinal and middle axes of the steel mantel, care is taken that the emerging tertiary air enter the dust/air mixture along a spiralling trajectory around it in the aiding direction rather than against it, thereby to avoid a loss of Kinetic energy. At the same time, a sufficient mixing with the tertiary air takes place so as to cause a full combustion of the coal particles.

In the preferred embodiment, anthracite dust is supplied in the amount of 600 kg/hour. The anthracite dust has a calorific value of 30,000 GJ/kg. Its fineness of grinding is for 95% smaller than 0.02 m/m. This is quite below the acceptable limit of 0.05 m/m. The volatile parts account for 8% of the anthracite dust in its raw state. The water content is 1%, also for raw anthracite, thus half the amount limit considered acceptable. The ash content is 15%. This is in relation to anthracite coal having an ignition temperature which is around 400 degrees C. depending upon the amount of volatile parts. Instead of anthracite coal, semi-bituminous coal can be used, which have fuel characteristics comparable to anthracite.

In order to operate the burner with the above-mentioned anthracite coal, an ignitor 47 is lowered into the flame chamber from the top of the burner centrally through a tube 48 mounted along the axis inside pipe 27. The ignitor 47 is an oil, or gas, burner. It has an igniting capacity of 10% the capacity of the burner. With the ignitor 47 sufficient preheating of the burner can be reached that the coal dust/air mixture spontaneously becomes ignited. During the ignition, the auxiliary equipment, e.g. the amount of fuel, is adjusted up to the stoichiometric conditions for the secondary zone, as well as for the second stage of combustion. Peak operation of the burner like normal operation is preferably accomplished with the same air distribution. This procedure facilitates the burning operation.

It is observed that the burner according to the present invention projects, to the extent of a major portion of its cooling system, e.g., with the hollow mantel, into the main combustion chamber of the associated boiler or furnace. As shown in FIG. 1, the burner is mounted through a flange 26 and enters the main combustion chamber. The tubes 22 for the tertiary air also are mounted through the flange 26. The inlets 4 for the cooling agent and the outlet 7 are outside flange 26 with the upper and closed end 3 of the burner.

We claim:

1. A method of controlling coal combustion of finely ground coal, including anthracite coal and semi-bituminous coal with low inflammability in a flame chamber, comprising: injecting a mixture of pulverized coal with primary air at one end of said flame chamber; burning the coal below the slag melting point; supplying to said mixture a high amount of heat to ignite the fuel from the sides of said flame chamber; supplying cooling air for cooling said flame chamber, with at least a portion of said cooling air after being warmed up by said flame chamber being used for preheating said coal, wherein said step of supplying heat includes igniting coal from said injected mixture and circulating pulverized coal particles towards walls of the flame chamber to cause ignition of the coal particles.

2. A method of controlling coal combustion according to claim 1, wherein the igniting temperature amounts to 1350 degrees C. at most.

3. A method of controlling coal combustion according to claim 2, wherein the coal if anthracite has a maximum grain size of 0.05 m/m and the coal if coke has a maximum grain size of 0.15 m/m.

4. A method of controlling coal combustion according to claim 3, wherein the coal possesses a maximum water content of 2%.

5. A method of controlling coal combustion according to claim 1, wherein at least one portion of the injected coal and/or supplied air and/or of a supplied coal/air mixture into the flame chamber is imparted spiralling motion.

6. A method of controlling coal combustion according to claim 5, wherein the swirling angle of the spiral motion is 10 to 80 degrees.

7. A method of controlling coal combustion according to claim 5, wherein a coal dust/air mixture is blown straight and without swirling and more air is blown spiralling around the coal dust/air stream.

8. A method of controlling coal combustion according to claim 1, wherein the supplied air and/or the injected coal is preheated.

9. A method of controlling coal combustion according to claim 8, wherein the coal is preheated with cold air and with heated-up air.

10. A method of controlling coal combustion according to claim 9, wherein said preheating air is cooled by mixing of cold air at a temperature which is sufficiently below the igniting temperature of the coal.

11. A method of controlling coal combustion according to claim 10, wherein the temperature of entry of the coal into the flame chamber is 100 degrees to 200 degrees C.

12. A method of controlling coal combustion according to claim 11, having a two-stage combustion with under-stoichiometric combustion in a first stage and completed by over-stoichiometric combustion in a second stage.

13. A method of controlling coal combustion according to claim 12, wherein 10 to 30% of an amount of air coming from air cooling of the burner as primary air is blown mixed with coal, 25-50% of the total amount of air is supplied as tertiary air to participate in the over stoichiometric finishing combustion and the rest is blown as secondary air together with the coal/air mixture primary air.

14. A method of controlling coal combustion according to claim 13, wherein the secondary air moves with a speed 2 to 4 times the speed of the primary air and the tertiary air with 5 to 7 times the speed of the primary air.

15. A method of controlling coal combustion according to claim 14, wherein the speed of the primary air amounts to at least 10 and at most 20 m/sec.

16. A method of controlling coal combustion according to claim 15, wherein the proportions of air are the same for peak operation of the burner and for subsequent continuous operation.

17. A method of controlling coal combustion according to claim 16, wherein partial loading is conducted by control of the coal dust amount and/or the tertiary air supply.

18. A method of controlling coal combustion according to claim 17, wherein the injected total air quantity corresponds to an air number of 1.05 to 1.6.

19. A method of controlling coal combustion according to claim 18, wherein the tertiary air is deflected into the flame under an inclination angle of 0 to 30 degrees relative to the radius of the burner.

20. A method of controlling coal combustion according to claim 19, wherein the shape of the flame is conformed with the tertiary air to a geometry of the boiler.

21. A method of controlling coal combustion according to claim 20, wherein the flame is lengthened by the tertiary air.

22. A method of controlling coal combustion according to claim 18 wherein the tertiary air is blown into the flame under an inclination angle of 60 to 80 degrees to the longitudinal axis of the burner.

23. A method of controlling coal combustion according to claim 22, wherein cooling around and externally of the flame chamber is controlled with an efficiency of 200 to 300 watt/m$^2$ per degree Kelvin.

24. A method of controlling coal combustion according to claim 23, wherein the burner efficiency amounts to at least 0.5 MW and at most 10 MW.

25. Apparatus for coal combustion of low flammability ground coal of the type including anthracite coal and semi-bituminous coal, comprising: a flame chamber together with a ceramic lining; means to circulate cooling air to control the combustion temperature below a slag melting point; means to selectively preheat ground coal particles to predetermined temperatures before admission into said flame chamber; means to inject primary air mixed with ground coal for combustion; means to inject secondary air at one end into the flame chamber to assist the ground coal particles to follow helical trajectories with a swirling motion; and means to supply tertiary air at a region proximate the other end of said flame chamber to complete coal combustion, said apparatus having a burner with an efficiency ratio to the volume of the flame chamber of 0.3 to 0.7 MW/m$^3$.

26. Apparatus as in claim 25, having a burner housing with cylindrical flame chamber, the ratio of the cross-dimension to longitudinal dimension being in the range of 0.4 to 0.75.

27. Apparatus as in claim 26, wherein the burner housing has on the side of the flame an average thermal capacity of 0.2 to 0.3 Kcal per KG per degree C.

28. Apparatus as in claim 27, wherein the burner housing has a thermal conductivity number of at least 1 and at most 20 watt/meter per degree C.

29. Apparatus as in claim 28, wherein said ceramic lining is concentric of the burner housing.

30. Apparatus as in claim 29, wherein an essential component of the ceramic lining is silicium carbide and/or aluminum oxide.

31. Apparatus as in claim 30, wherein the silicium carbide proportion is at least 20 and at most 95%.

32. Apparatus as in claim 31, wherein the thickness of the ceramic lining is at least 10 and at most 50 mm.

33. Apparatus according to claim 32, having pins for holding the ceramic lining.

34. Apparatus according to claim 33, wherein the burner housing is constituted as a hollow mantel.

35. Apparatus as in claim 34, characterized by means to provide fluid cooling of the hollow mantel.

36. Apparatus as in claim 35, including a cooling agent to cool the hollow mantel passing one way along the longitudinal direction of the hollow mantel and selectively including a guiding plate and duct plates for imparting a spiralling trajectory to the cooling agent passing inside the hollow mantel.

37. Apparatus as in claim 36, with said duct plates spiralling in opposite directions on opposite sides of the guiding plate.

38. Apparatus as in claim 37, including a cylindrical burner housing.

39. Apparatus as in claim 38, having a central admission of an air/dust mixture.

40. Apparatus as in claim 39, having a concentrical admission of secondary air.

41. Apparatus as in claim 40, having a swirling device in the secondary admission.

42. Apparatus as in claim 41, wherein the swirling device consists selectively of movable guiding plates adjustable nozzles.

43. Apparatus according to claim 42, having tubes for passing tertiary air regularly distributed all around.

44. Apparatus according to claim 42, having a common diffuser for the admitted air.

45. Apparatus as in claim 44, selectively having regulating dampers and regulating valves and sensing diaphragms in the air ducts.

46. Apparatus according to claim 45, wherein tertiary air tubes terminate and open before the opening of the burner housing.

47. Apparatus according to claim 46, having a tunnelling overall structure of the burner.

48. A method of burning low flammability pulverized coal in a flame chamber having an inner refractory lining, comprising the steps of: injecting a mixture of pulverized coal with primary air at one end of said flame chamber; supplying to said mixture a high quantity of heat from the sides of said flame chamber while maintaining the temperature of combustion below the slag melting point of the coal by cooling air; supplying air for cooling said flame chamber, with at least a portion of said cooling air being drawn after being warmed-up by said flame-chamber for preheating said coal, wherein said step of supplying heat includes igniting coal from said injected mixture and circulating pulverized coal from said injected mixture to cause ignition by said refractory lining.

49. The method of claim 48, with said combustion temperature being less than 1350 degrees C.

50. The method of claim 47 or 48, with coal being anthracite and the grains of the pulverized coal being less than 0.05 m/m.

51. The method of claim 48, with coal being coke and the grains of the pulverized coal being less than 0.15 m/m.

52. The method of claim 50, with less than 2% water contents in said coal.

53. The method of claim 51, with less than 2% water contents in said coal.

54. The method of claim 48, with the provision of a refractory lining around said flame chamber, with said heat supplying step including:

(a) igniting coal from said injected mixture to heat-up said lining;

(b) circulating coal from said injected mixture to cause ignition by said lining.

55. The method of claim 54, said combustion temperature maintaining step including the provision of controlling heat transfer from said flame chamber around said lining, by cooling.

56. The method of claim 55, with air being supplied for cooling said flame chamber.

57. The method of claim 48, with preheating of said coal being effected by mixing said warmed-up air with cold air in proportion to hold the mixed air temperature substantially below the igniting temperature of the coal.

58. The method of claim 57, with said primary air comprising said mixed air.

59. The method of claim 58 including a step of injecting a portion of said cooling air derived after being warmed-up by said flame chamber as secondary air into said flame chamber concentrically of said pulverized coal and primary air mixture.

60. The method of claim 59, with a swirling action being imparted to one of said secondary air and pulverized coal/primary air mixture for performing said circulating step.

61. The method of claim 60, with the provision of a main combustion chamber adjoining said flame chamber about a common opening, said common opening being remote from said one end of said flame chamber, with tertiary air being supplied through ducts externally of said flame chamber and injected into said main combustion chamber in the vicinity of said common opening.

62. The method of claim 61, with under stoichiometric proportions being selected with said primary and secondary air for the combustion of coal in said flame chamber and above stoichiometric proportions being selected with said tertiary air for the combustion of coal in said main combustion chamber.

63. The method of claim 62, with said tertiary air constituting a third portion of said cooling air derived after being warmed-up by said flame chamber, said one portion, said another portion and said third portion being adjustable separately and concurrently.

64. In a pulverized coal burner having primary air mixed with pulverized coal for injection as a coal/air mixture from one end of a flame chamber, a flame chamber opening remote from said one end, and a mantel surrounding said flame chamber and extending from said one end to said flame chamber opening, the combination of:
(a) a unitary structure having an axis of revolution, including said mantel and an air distributor mounted above said mantel at said one end and about said axis; said mantel being hollow and having forced air circulating therethrough for cooling thereof from a peripheral inlet to a central outlet, both located toward said one end, with said air distributor being supplied with air axially from said outlet and outputting air radially in two opposite directions, one toward the axis as a primary air for said mixture, another to the periphery away from said axis as tertiary air;
(b) a ceramic lining mounted on said mantel on the side of said flame chamber.

65. The burner of claim 64, with said air distributor outputting secondary air injected coaxially with said primary air and coal mixture.

66. The burner of claim 65, with the total of said primary, secondary and tertiary air being equal to said air circulating through said hollow mantel.

67. The burner of claim 66, with duct means for the primary air derived from said air distributor, said duct means being connected to said flame chamber through said one end of said mantel on the axis thereof.

68. The burner of claim 67, with said secondary air being injected with a spiralling trajectory around said primary air at said one end for mixing with said coal/air mixture.

69. The burner of claim 68, with pulverized coal being fed into said duct means for mixing with said primary air.

70. The burner of claim 69, with cold air being injected into said duct means before said pulverized coal.

71. The burner of claim 70, with said tertiary air from said air divider being supplied outside said mantel and fed toward the said axis in the vicinity of said flame chamber opening.

72. The burner of claim 71, with a plurality of tubes disposed regularly at the periphery of said mantel, supplied radially with said tertiary air from said air distributor, extending longitudinally of said mantel and parallel to said axis, and terminating each with a nozzle at an angle relative to said axis, said nozzles discharging into the vicinity of said flame chamber opening.

* * * * *